United States Patent [19]

Shapiro et al.

[11] 3,848,149

[45] Nov. 12, 1974

[54] ELECTRIC MACHINE ROTOR CURRENT COLLECTING DEVICE

[76] Inventors: Aron Beniaminovich Shapiro, Basseinaya ulitsa, 53, kv.71;
Vladimir Pavlovich Chernyavsky, Pulkovskaya ulitsa, 17, kv. 185;
Ibragim Akhmedovich Kadi-Ogly, Tallinskoe shosse, 66, kv. 180, all of Leningrad, U.S.S.R.

[22] Filed: Nov. 8, 1972

[21] Appl. No.: 304,830

[52] U.S. Cl. .............................. 310/229, 310/227
[51] Int. Cl. ............................................. H02k 13/12
[58] Field of Search .......... 310/229, 219, 227, 232, 310/230, 223, 220, 221, 222, 239, 242

[56] References Cited
UNITED STATES PATENTS

| | | | |
|---|---|---|---|
| 1,066,175 | 7/1913 | Barry | 310/227 |
| 1,623,846 | 4/1927 | Lang | 310/227 |
| 1,922,191 | 8/1933 | Baker | 310/219 |
| 1,924,415 | 8/1933 | Ringwald | 310/219 |
| 3,206,630 | 9/1965 | Berger | 310/227 |
| 3,673,447 | 6/1972 | Zumbach | 310/227 |

*Primary Examiner*—R. Skudy
*Attorney, Agent, or Firm*—Waters, Roditi, Schwartz & Nissen

[57] ABSTRACT

An electric machine rotor current-collecting device which has electric brushes in sliding contact with slip rings and current-collecting buses. The brushes are connected with the current-collecting buses by means of current leads made of a flexible metal conductor having a high effective electric resistance. The current leads are enclosed in pipes of an elastic insulating material through which a liquid coolant is made to flow. The arrangement provides for more uniform distribution of the current load between the operating brushes.

4 Claims, 1 Drawing Figure

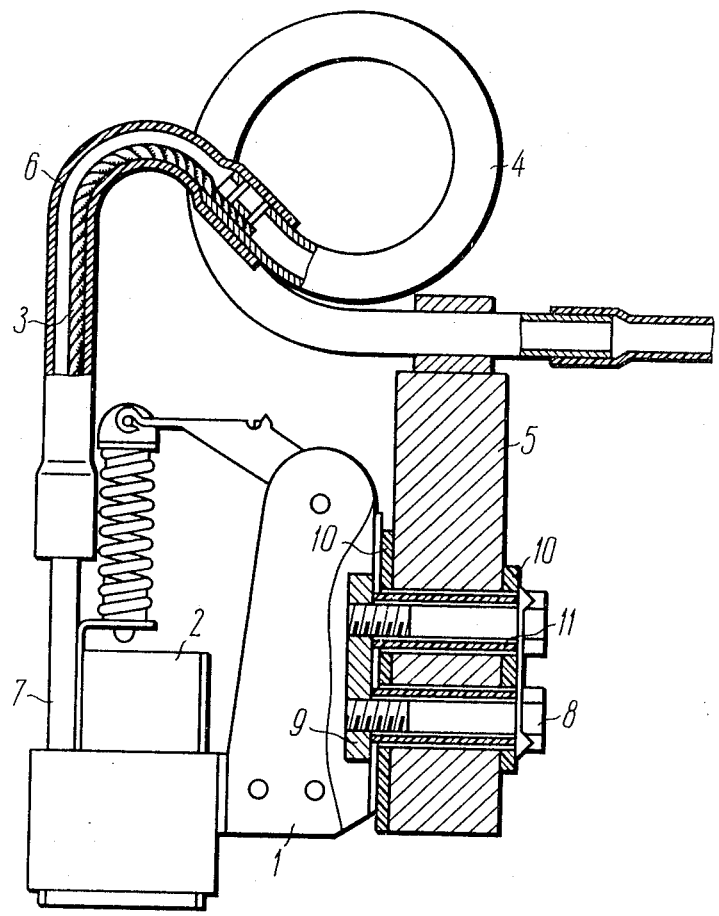

ELECTRIC MACHINE ROTOR CURRENT COLLECTING DEVICE

The present invention relates to heavy current electric machine rotor current-collecting devices.

Known in the art are electric machine rotor current collecting devices which comprise banks of electric brushes with flexible current leads parallel-connected between a current collecting bus and rotary slip rings.

Prior-art current-collecting devices have their current distribution between brushes generally determined by the brush wiping contact electric resistance value which varies over a rather wide range. It is known by experience that this value of the outwardly alike brushes substantially differs and arbitrarily and uncontrollably varies with time. The brush currents alter therewith from 0.1 to 5.0 of the brush mean rated current that considerably impairs the efficiency of the current collecting device and results in sparking, rapid wear of individual brushes, rapid heating and wear of slip rings.

In the wiping contact of the brush and ring an ionization process is known to take place due to which the value of voltage drop across the brush wiping contact is little affected by the brush current intensity and normally ranges from 1 to 1.2 V irrespective of the brush current intensity.

Conventional brushes have an electric resistance of the current lead, fittings and the brush proper made low and a voltage drop across them ranging from only 1 to 10 per cent of the common voltage drop across the brush, i.e. between the current-collecting bus and the slip ring. The rest 99 to 90 per cent of the voltage between the current-collecting bus and the ring drops across the brush wiping contact.

It is an object of the present invention to improve the operation of an electric machine rotor current-collecting device, i.e., to reduce sparking in the brush wiping contact and to decrease wear of individual brushes and slip rings.

The basic object of the present invention is to provide such a current-collecting device which would make it possible to obtain a more uniform current distribution between individual electric brushes thereof.

This object is achieved by that in an electric machine rotor current-collecting device comprising electric brushes which slide over slip rings, current-collecting buses and current leads which connect the electric brushes with the current-collecting buses, according to the invention, the effective electric resistance value of each current lead is chosen reasoning from said current lead resistance being commensurable with the electric resistance value of the electric brush wiping contact at the rated current of said brush.

The electric machine rotor current-collecting device is expedient to have its electric brush current leads made of a flexible steel conductor and enclosed in pipes of a resilient insulating material wherethrough flows a liquid coolant.

Besides, it is possible that said current leads be made composed of a flexible copper conductor which is enclosed in a pipe of a resilient material and a steel pipe of a high electric resistance material which are series-connected and through which flows a liquid coolant.

Compared to a conventional embodiment, the current lead resistance value herein is increased from 10 to 50 times. In doing so, the current distribution between brushes is basically determined by a constant resistance of the brush current lead and not by an altering resistance of the brush wiping contact. It is known by experience that in such current leads the currents of parallelconnected brushes vary within a range from 0.85 to 1.2 of the brush mean rated current which significantly improves the current-collecting device operation and obviates sparking, rapid wear of individual brushes and diminishes wear of the slip rings.

Increasing the resistance of the brush current leads results in practically doubling a voltage drop between the current-collecting bus and the slip ring and many times increasing the losses across the brush current leads. These increased losses but slightly affect the machine efficiency as a whole and are compensated by an increased reliability in operation, as well as by a decrease of wear of the brushes and slip rings when intensively removing heat from the brush current leads and keeping their temperature at a low level that does not impair the operation of the brushes. Practically, the only reasonable embodiment of the brush current leads having a rather high electric resistance is one wherein the current leads are liquid- (water-) cooled.

The electric machine rotor current-collecting device will now be explained in greater detail with reference to an embodiment thereof in conjunction with the accompanying drawing which is a partially cut general view of said current-collecting device.

The electric machine rotor-current collecting device comprises current-conducting fittings 1 and an electric brush 2. Connected to the brush 2 is one end of a flexible copper current lead 3, and the other end of the copper current lead 3 is connected to the inner surface of one end of a pipe 4 made of high electric resistance steel. The other end of the pipe 4 is connected to a currentcollecting bus 5. The current lead 3 is enclosed in a resilient insulating pipe 6 coupling together the pipe 4 and a pipe 7 of the current-conducting fittings. A liquid coolant flows in succession through the pipes 7, 6 and 4 carrying away losses of the current lead and partially those of the brush.

Referring to the drawing, the current collecting bus 5 is fastened to the current-conduction fittings 1 by bolts 8 and a plate 9. The current-collecting bus 5 is insulated from the fittings 1 with insulating spacers 10 and bushes 11.

What is claimed is:

1. An electric machine rotor current-collecting device comprising electric brushes sliding over the machine slip rings, current-collecting buses and current leads connecting the electric brushes with the current-collecting buses, the electrical resistance of each current load being substantially equal to the electrical resistance of the electric brush wiping contact at the rated current of said brush, said brush current leads being made of a flexible steel conductor and enclosed in pipes of resilient insulating material through which a liquid coolant flows.

2. An electric machine rotor current-collecting device comprising electric brushes sliding over the machine slip rings, currentcollecting buses and current leads connecting the electric brushes with the current-collecting buses, the electrical resistance of each current load being substantially equal to the electrical resistance of the electric brush wiping contact at the rated current of said brush, said brush current leads comprising a flexible copper conductor enclosed in a pipe of resilient insulating material, and a seriesconnected steel pipe through which a liquid coolant flows.

3. An electric machine rotor current-collecting device comprising wiping electric brushes, current-collecting buses; current leads connecting said brushes with said current-collecting buses, said current leads being made of a flexible metal conductor having substantially high effective electric resistance; pipes of electric insulating material for enclosing said current leads; and means in said pipes for circulating liquid coolant through said pipes.

4. An electric machine rotor current-collecting device, as claimed in claim 3, wherein said current leads are made of a series-connected flexible metal conductor having substantially low effective electric resistance and being enclosed in said pipe of elastic insulating material, said means for circulating said liquid coolant comprising a metal pipe having substantially high effective electric resistance through which said liquid coolant flows.

* * * * *